Patented Apr. 30, 1946

2,399,465

UNITED STATES PATENT OFFICE 2,399,465

DUST PREVENTIVE COMPOSITION

Edward R. Butcher, Harmarville, Pa., assignor to Gulf Research & Development Company, Pittsburgh, Pa., a corporation of Delaware No Drawing. Application December 1, 1944, Serial No. 566,256

5 Claims. (Cl. 252—88)

The present invention relates to dust preventive compositions, and is particularly concerned with an improved liquid spraying agent adapted to inhibit the surface dusting of the soil in playgrounds, training camps, dirt walks and the like.

The principal object of this invention is to provide a stable dust-laying liquid composition resistant to removal from the soil by rain, and substantially without color and odor. Another object of this invention is to provide a stable dust-laying liquid composition which has high wetting ability in contact with soil. Other objects will be more readily apparent from the following detailed description of this invention.

Many compositions have been employed for laying dust on unpaved highways and railroad beds. The principal characteristics desired in such compositions are permanence of the dust-laying and binding action of the solution used and ease of wetting, or penetration of the composition into the soil. The most widely used compositions for this purpose have been aqueous solutions of calcium chloride and heavy petroleum oils of asphalt base. Solutions of calcium chloride are effective because of the hygroscopic property of the calcium chloride deposited in the soil. The chief disadvantage of calcium chloride, however, lies in the fact that it is readily soluble in water and is soon washed away by the rain. The crude asphaltic oils are more lasting but are undesirable because of their stickiness, odor and color and rather low wetting power. If the odor and color of such oils are removed by refining, their permanence is also destroyed. One type of dust preventative using a refined petroleum distillate has also been proposed by Hunter (U. S. Patent 2,122,-524). The proposed composition consists of a distillate of 22 to 31° A. P. I. gravity containing a small quantity of hydrous degras. This dust preventive composition is lasting, has good odor and color and has fair wetting properties, but is relatively unstable and tends to form separate layers upon standing before application to dust-forming surfaces.

In accordance with the present invention, it has been found that a stable dust-laying composition which combines good resistance to removal from soil by rain water, with good odor and color and good wetting properties can be provided by incorporating in a petroleum distillate of low viscosity and low volatility a small amount of oleic acid alone or in combination with a metal naphthenate and with or without a wetting agent. The function of the oleic acid alone or in combination with the metal naphthenate is to reduce the surface tension of the oil-base to which they are added and to cause greater penetration of the oil-base into the soil to which my improved dust preventive composition is applied.

For the base of the dust-laying composition of this invention, any relatively non-volatile or high-boiling petroleum distillate may be employed. However, it is advantageous to use a distillate oil fraction of moderately low viscosity. The distillate oil may be used in its unrefined state, or it may be refined. The degree of refining may be carried to any practical extent. A particularly satisfactory petroleum oil fraction for the purpose of this invention is a distillate of from 21 to 32° A. P. I. gravity having an SUS viscosity not under 55 seconds at 100° F. and possessing a minimum of petroleum odor.

With such a petroleum distillate there is admixed, according to this invention, a small amount of a crude or refined oleic acid, alone or in combination with a metal naphthenate. Commercial oleic acid, known as Red oil, is preferred because of its low cost. However, satisfactory results may be obtained with either crude or refined oleic acid. It will be understood that commercial oleic acid is usually not a chemically pure product, since even those acids sold commercially as being pure, still contain small quantities of less saturated acids, such as linoleic. Pure oleic acid is colorless and free from odor, while those commercially available are light brown and have a definite fatty odor. Any commercial variety of oleic acid which does not contain large amounts of saturated (solid) acids, or of acids more unsaturated than oleic, is satisfactory. The amount of oleic acid alone or oleic acid in combination with metal naphthenate salts incorporated in the petroleum distillate is such that no substantial separation of either the oleic acid alone or the oleic acid combined with the metal naphthenate salt takes place on standing. Amounts of oleic acid corresponding to about 0.5 to 5.0 per cent by weight of the oil are generally used. However, higher amounts of oleic acid may be used for special compounding purposes. For example, as much as 50 per cent by weight of oleic acid may be used for dust-preventive compositions which are to be applied to soils consisting of large granular particles. In the case of refined oils, up to about 40 to 50 per cent by weight of oleic acid may be added without adversely effecting the stability of such oils on standing, while in the case of unrefined oils, the addition of more than 5 per cent of oleic acid thereto results in instability of the oil on standing. In such compositions therefore refined oils should be used. When compositions are made comprising up to about 40 to 50 per cent by weight of oleic acid with a refined oil, it is not necessary to use a metal naphthenate with such compositions.

When metal naphthenates are used in combination with the oleic acid, a lesser amount of oleic acid is required to give the desired results. The ratio of oleic acid to metal naphthenate is advantageously between about 20:1 and about 2:1. Of the metal naphthenates, best results have been obtained with calcium naphthenate, sodium naphthenate, tin naphthenate, zinc naphthenate, copper naphthenate, nickel naphthenate and aluminum naphthenate. These naphthenates may be used in either their solid form or in liquid form, in which they are commercially available. It is most advantageous to use the liquid forms which are usually solutions of the metal naphthenates in coal tar solvents, turpentine, light hydrocarbons and the like. These solutions are soluble in and miscible with mineral oil at ordinary room temperature and are readily incorporated in the dust-laying compositions. The amount of metal naphthenate incorporated in the dust-laying compositions will vary with the particular metal naphthenate used and its solubility in mineral oil. In general, I have found that by incorporating 0.05 to 1 per cent by weight of a metal naphthenate in the form of a solution containing less than about 50 per cent by weight of the metal naphthenate, most advantageous results are obtained.

The compositions thus produced comprising a light petroleum oil and preferably 0.5 to 5 per cent of oleic acid with or without 0.05 per cent to 1 per cent by weight of a metal naphthenate are effective dust preventing agents, have good wetting power and stability, and are resistant to removal from the soil. However, the wetting properties of such a solution may be improved, if desired, by the additional incorporation of a minor amount of a wetting agent. Any suitable wetting agent may be used, and satisfactory results have been obtained with a variety of commercial wetting agents, such as "Tergitol" pentrants, "Dresinate," "Alkaterge-O" and the like. The Tergitol penetrants are, in general, aqueous solutions of the sodium salts of the sulfuric acid esters of higher alcohols usually containing 8 to 19 carbon atoms. Tergitol penetrant No. 4, for example, is an aqueous solution of the sodium sulfate derivative of 7-ethyl-2-methyl-4-undecanol; No. 7 is an aqueous solution of the sodium sulfate derivative of 3,9-diethyl-6-tridecanol; and No. 08 is an aqueous solution of the sodium sulfate derivative of 2-ethylhexanol. Dresinate is a well-known commercial wetting agent containing alpha-terpineol and sodium oleate. Alkaterge-O is also a well-known commercial wetting agent of the high molecular weight amine type compound.

If desired, a germicide may be added to the dust preventive composition of my invention. In such cases, dichlorpentane, cresol, cresylic acid and the like may be added. In most cases, it has been found desirable that the amount of such germicide be not greater than about 0.2 per cent.

In general, the dust-laying compositions which have been found particularly suitable comprise a petroleum oil distillate of about 21 to 32° A. P. I. gravity in an amount corresponding to 95.6 to 99.31 per cent by weight; oleic acid in an amount corresponding to 0.5 to 3.0 per cent by weight; a metal naphthenate in an amount corresponding to 0.05 to 1.0 per cent by weight; Tergitol penetrant No. 4 in an amount corresponding to 0.03 to 0.1 per cent by weight with or without up to 0.1 per cent of water and 0.2 per cent of a germicide. Compositions containing these respective components in percentages intermediate between the limits recited produce particularly good results.

EXAMPLE I

In the following specific example, there are illustrated the advantageous properties obtained in dust-laying compositions prepared according to this invention. In the example, the results of comparative tests on the wetting power of two different petroleum oil distillates and dust-laying compositions prepared according to this invention are demonstrated.

In determining the wetting power of the respective oil compositions, the tests were made according to the "Standard rub-out method" which has been adopted by the Federal Specification Board and the American Society for Testing Materials (D 332-31 T) with the exception that a standardized soil sample was used instead of a pigment. The procedure is as follows:

Take 1 gram, or any multiple thereof, of a pigment. Place the pigment upon a marble slab or glass plate and gradually add the oil, drop by drop, to the pigment, and after the addition of each drop thoroughly incorporate the oil with the pigment by the use of a stiff spatula. The test is completed when exactly enough oil has been incorporated with the pigment to produce a very stiff, putty-like paste which does not "break" or separate. A laboratory burette is used to measure the amount of oil incorporated into the pigment.

The standardized soil sample was prepared by grinding some typical top soil in a ball-mill until it passed through a No. 40 standard screen. The material was then dried in an oven at 250° F. for 6 hours.

In Table I there are shown by comparison the properties of the two base oils tested and the properties of the oleic acid used in compounding the dust preventive composition of the present invention.

Table I

| | Gravity, °A. P. I. | Viscosity, S. U. S. at 100° F. | Color N. P. A. | Neutralization No. | Iodine No. | Pour point, °F. |
|---|---|---|---|---|---|---|
| Oil X (100/2 Texas oil) | 24.1 | 106.0 | 2 | 0.04 | 10.6 | −45 |
| Oil Y (100 Texas distillate) | 22.3 | 105.0 | 5 | 1.90 | 13.3 | −40 |
| Oleic acid | 26.0 | 100.0 | | 180.0 | 91.9 | +25 |

In Table II are shown the compositions tested and the wetting power of each as determined by the standard rub-out test. Then is shown also a comparison of the respective results showing the percentage increase in wetting power of oil Y and each of the compositions over oil X which had the lowest wetting power.

Table II

|  | Comparison of dust-laying oils | | | | | |
| --- | --- | --- | --- | --- | --- | --- |
|  | Oil X | Oil Y | Blend A | Blend B | Blend C | Blend D |
| Oil X | 100 |  | 98.85 |  |  |  |
| Oil Y |  | 100 |  | 98.85 | 98.9 |  |
| Oleic acid |  |  | 1.0 | 1.0 | 1.0 | 99.85 |
| "Tergitol" penetrant No. 4 |  |  | 0.05 | 0.05 |  | [1] 0.05 |
| Water |  |  | 0.1 | 0.1 | 0.1 | 0.1 |
| Amt. liquid to wet 100 gms. soil_____cc | 34.4 | 29.3 | 27.6 | 25.2 | 25.4 | 28.4 |
| Relative area wetted per unit vol. of oil to unit depth of soil | 1.0 | 1.17 | 1.25 | 1.36 | 1.35 | 1.21 |
| Increase in wetting power over oil X_____per cent |  | 17 | 25 | 36 | 35 | 21 |

[1] "Tergitol" penetrant No. 7 was used instead of "Tergitol" penetrant No. 4.

The data given in Table II demonstrate the remarkable effect obtained when 1 per cent of oleic acid is added to the oils. In blend A it will be noted that the addition in substantially the proportions shown, of oleic acid, "Tergitol" penetrant No. 4, and water to oil X gave a product having a wetting power 25 per cent greater than the wetting power of the unblended oil. By adding these same agents, in substantially the same proportions, to oil Y (blend B), a product having a 36 per cent increased wetting power over oil X was obtained. In this connection, however, it should be noted that the oil Y itself is 17 per cent better than the oil X. When the "Tergitol" was omitted from blend B, the increase in wetting power over oil X changed only from 36 to 35 per cent (blend C). When the oleic acid was omitted from blend B, however, the wetting power dropped from 36 to 21 per cent (blend D). Thus, the effect of oleic acid on the wetting power of an oil dust-preventing composition is quite pronounced.

Another blend which was not shown in the above table was made similar to blend A except that 2.0 per cent of oleic acid was used instead of 1 per cent. The larger amount of oleic acid gave an appreciable increase in wetting power, i. e., about 19 per cent over blend A which contained only 1 per cent of oleic acid.

Example II

In this example there are illustrated the results obtained when using mixtures of oleic acid and metal naphthenates in dust-laying compositions prepared according to this invention. In Table III comparative results are shown between compositions prepared from oil X above referred to in Example I, and this oil in combination with oleic acid alone, with tin naphthenate in concentrations of 0.5 and 0.05 per cent alone, and in admixture with oleic acid in an amount corresponding to 1 per cent with 0.05 and 0.5 per cent of tin naphthenate.

also effective for the purpose of this invention. In all of these tests, the standard rub-out method referred to above in Example I was used. As indicated above, the use of a suitable metal naphthenate with oleic acid is advantageous, in that equivalent results are obtainable with lesser amounts of oleic acid. For example, the use of 0.05 per cent tin naphthenate and 1.0 per cent of oleic acid is as effective as the use of 2.0 per cent by weight of oleic acid alone.

The foregoing specification and description include the essential and distinctive thought of my invention, but it is to be distinctly understood that the same may be modified in various ways and/or combined with various other details without affecting the peculiar results obtained, and without departing from the spirit of the invention or the scope of the appended claims in which I intend to claim all the patentable novelty inherent in my invention.

I claim as my invention:

1. A stable liquid dust-laying composition resistant to removal from soil by water and having high wetting power and penetration, consisting predominantly of a petroleum distillate oil of from 21 to 32° A. P. I. gravity containing 0.5 to 5.0 per cent by weight of oleic acid and 0.05 to 1 per cent by weight of a metal naphthenate.

2. A stable liquid dust-laying composition resistant to removal from soil by water and having high wetting power and penetration, consisting predominantly of a petroleum distillate oil of from 21 to 32° A. P. I. gravity, containing a metal naphthenate and 0.5 to 5.0 per cent by weight of oleic acid, the ratio of oleic acid to metal naphthenate being between 20:1 and 2:1.

3. A stable liquid dust-laying composition resistant to removal from soil by water and having high wetting power and penetration, consisting predominantly of a petroleum distillate oil of from 21 to 32° A. P. I. gravity containing 0.5 to 5.0 per cent by weight of oleic acid and 0.05 to 1 per cent by weight of a metal naphthenate,

Table III

|  | Oil blends (make-up, per cent by wt.) | | | | | |
| --- | --- | --- | --- | --- | --- | --- |
|  | Oil X | 1 | 2 | 3 | 4 | 5 |
| Oil X | 100 | 99.0 | 99.5 | 99.95 | 98.5 | 98.95 |
| Oleic acid |  | 1.0 |  |  | 1.0 | 1.00 |
| Tin-naphthenate (12.2% Sn) |  |  | 0.5 | 0.05 | 0.5 | 0.05 |
| Amt. liquid to wet 100 gms. soil_____cc | 34.4 | 27.4 | 28.2 | 28.5 | 26.2 | 23.0 |
| Relative area wetted per unit vol. of oil to unit depth of soil | 1.0 | 1.26 | 1.21 | 1.19 | 1.31 | 1.32 |
| Per cent increase in wetting power over oil X |  | 26 | 21 | 19 | 31 | 32 |

It will be observed from these results that combinations of the naphthenate with oleic acid are the ratio of oleic acid to metal naphthenate being between 20:1 and 2:1.

4. A stable liquid dust-laying composition resistant to removal from soil by water and having high wetting power and penetration, consisting predominantly of a petroleum distillate oil of from 21 to 32° A. P. I. gravity containing 0.5 to 5.0 per cent by weight of oleic acid and 0.05 to 1 per cent by weight of a metal naphthenate, the ratio of oleic acid to metal naphthenate being between 20:1 and 2:1, and a minute amount of wetting agent.

5. A stable liquid dust-laying composition resistant to removal from soil by water and having high wetting power and penetration comprising 95.6 to 99.31 per cent by weight of a low viscosity, low volatility petroleum distillate oil of 21 to 32° A. P. I. gravity, 0.5 per cent to 5.0 per cent by weight of oleic acid, 0.05 to 1.0 per cent by weight of a metal naphthenate, 0.03 to 0.1 per cent of a wetting agent containing a sodium salt of a sulfonated higher alcohol, up to 0.1 per cent of water, and up to 0.2 per cent of a germicide.

EDWARD R. BUTCHER.